(12) United States Patent
Magne et al.

(10) Patent No.: US 6,998,632 B2
(45) Date of Patent: Feb. 14, 2006

(54) ENERGY COMPENSATION, WIDE BEAM WIDTH RADIATION SENSOR, FOR REMOTE DOSIMETRY, AND DOSIMETRY DEVICE USING THIS SENSOR

(75) Inventors: Sylvain Magne, Fontenay aux Roses (FR); Gilles Ranchoux, Lyons (FR); Jean-Pierre Bouvet, Marcoussis (FR)

(73) Assignee: Commissariat a l'Energie Atomique, Paris (FR)

( * ) Notice: Subject to any disclaimer, the term of this patent is extended or adjusted under 35 U.S.C. 154(b) by 106 days.

(21) Appl. No.: 10/184,824

(22) Filed: Jul. 1, 2002

(65) Prior Publication Data

US 2003/0057385 A1    Mar. 27, 2003

(30) Foreign Application Priority Data

Jul. 2, 2001    (FR)    ................................... 01 08736

(51) Int. Cl.
     *G21K 4/00*    (2006.01)
(52) U.S. Cl. ........................................ 250/581; 250/366
(58) Field of Classification Search ................ 250/581, 250/580, 366, 367, 483.1, 486.1
     See application file for complete search history.

(56) References Cited

U.S. PATENT DOCUMENTS

| | | |
|---|---|---|
| 3,426,197 A | 2/1969 | Waly et al. |
| 4,876,454 A | 10/1989 | Burgess |
| 4,999,504 A | 3/1991 | Braunlich et al. |
| 5,030,834 A | 7/1991 | Lindmayer et al. |
| 5,059,801 A | 10/1991 | Burgess |
| 5,091,653 A | 2/1992 | Creager et al. |
| 5,606,163 A | 2/1997 | Huston et al. |
| 5,640,017 A | 6/1997 | Thevenin |
| 5,905,262 A | 5/1999 | Spanswick |
| 5,962,857 A | 10/1999 | McKeever et al. |
| 6,041,150 A | 3/2000 | Hasing et al. |
| 6,127,685 A | 10/2000 | Yoder et al. |
| 6,140,651 A | 10/2000 | Justus et al. |
| 6,452,184 B1 * | 9/2002 | Taskar et al. ............... 250/367 |

FOREIGN PATENT DOCUMENTS

WO    WO 97/21112    6/1997

OTHER PUBLICATIONS

A. L. Huston, et al., Appl. Phys. Lett., vol. 68, No. 24, pp. 3337-3379, "Fiber-Optic-Coupled, Laser Heated Thermoluminescence Dosimeter for Remote Radiation Sensing", Jun. 10, 1996.

P. K. Soltani, et al., Fiber Optic and Laser Sensors VII, vol. 1169, pp. 540-551, "Fiber Optic Radiation Dosimetry", 1989.

B. L. Justus, et al., Radiation Protection Dosimetry, vol. 81, No. 1, pp. 5-10, "Optically and Thermally Stimulated Luminescence Characteristics of Cu$^+$-Doped Fused Quartz", 1999.

(Continued)

*Primary Examiner*—Otilia Gabor
(74) *Attorney, Agent, or Firm*—Oblon, Spivak, McClelland, Maier & Neustadt, P.C.

(57) ABSTRACT

A sensor including at least one element made out of a radiation detection material, capable of emitting a luminescence radiation and transparent to this radiation, and two radiation filtration screens, one thin and placed opposite one end of the element, the other thick and placed at the periphery of the element. The sensor may be coupled with a flexible optical wave guide designed to collect and convey the luminescence radiation.

17 Claims, 5 Drawing Sheets

OTHER PUBLICATIONS

A. S. Pradhan, et al., Nuclear Instruments and Methods, vol. 166, pp. 497-501, "Metal Filters for the Compenstation of Photon Energy Dependence of the Response of $CaSO_4$:Dy-Teflon TLD Discs", 1979.

M. S. Akselrod, et al., Radiation Protection Dosimetry, vol. 47, No. 1/4, pp. 159-164, "Preparation and Properties of $\beta\text{-}AL_2O_3$:C", 1993.

B. G. Markey, et al., Radiation Measurements, vol. 24, No. 4, pp. 457-463, "Time-Resolved Optically Stimulated Luminescence from $\beta\text{-}AL_2O_3$:C", 1995.

S. W. S. McKeever, et al., Radiation Protection Dosimetry, vol. 65, No. 1-4, pp. 267-272, "Pulsed Optically Stimulated Luminescence Dosimetry Using $\beta\text{-}AL_2O_3$:C", 1996.

R. Pannetier, Vade- Mecum Du Technicien Nucleaire, pp. D-25—D-27, "D.F. Les Dosimetres", 1982.

B. Burgkhardt, et al., Kerntechnik 55, No. 6, pp. 362-367, "Modern Photon Energy Compensation Filters for Solid State Dosemeters", 1990.

* cited by examiner

ENERGY COMPENSATION, WIDE BEAM WIDTH RADIATION SENSOR, FOR REMOTE DOSIMETRY, AND DOSIMETRY DEVICE USING THIS SENSOR

TECHNICAL FIELD

The present invention relates to a radiation sensor for remote dosimetry and a dosimetry device using this sensor.

It applies in particular to X-rays and gamma rays.

In nuclear installations or in nuclear medicine, the personnel are constantly subjected to the effect of radiation. As a result, it is important to know with precision, if possible in real time and, in any case, at the end of or during each period of presence, the dose received by the personnel as well as the cumulative dose, for example over one month or one year, in order to ensure that the regulations in force in this field are complied with.

Individual dosimetry is carried out using passive or active dosimeters. Passive dosimeters are used monthly or on demand, whereas active dosimeters enable dosimetry to be carried out in real time on intervening personnel, leading to a greater control of the evolution of individual doses and radiological conditions in nuclear installations and thus to comply with the ALARA principle (As Low As Reasonably Achievable). By way of indication, the ICRP (International Commission on Radiological Protection) recommends that annual individual doses are limited to 20 mSv, and this recommendation is taken up in a European Guideline dated 1996.

Dosimetry in real time, or operational dosimetry, necessitates a detection limit of around 1 $\mu$Sv to several mSv, whereas the monitoring of installations is less restrictive, and the limit can vary from several tens of $\mu$Sv to several mSv depending on the installations. Within the scope of operational dosimetry, the operators wear dosimeters on their chests, and these are supposed to give an indication of the dose for the entire body, and dosimeter-rings, to monitor the doses received by the hands.

There are absolute dosimeters such as pen dosimeters (ionisation chambers), which give the dose integrated over time with a direct analogue reading. These dosimeters are sensitive to impact, their range of measurement is limited and their use is restricted to specialists. There are also Geiger-Muller type counters, which necessitate a high voltage and, like pen dosimeters, cannot be used in the field. The most widely used dosimeters in the field are relative dosimeters.

Apart from a few notable exceptions (plastics, diamond), the materials making up dosimeters that are used industrially (photographic films, scintillators, semi-conductors, radiophotoluminescence dosimeters (RPL), thermoluminescent dosimeters (TL) or optically stimulated luminescence dosimeters (OSL) give an over-response, in other words a response higher than the correct response, especially at low energies.

In the following description, we will detail most of the highest performance materials used for the detection of radiation and we will show that, to use them in the very specific field of radioprotection, they must be packaged in specific casings in order to make their energy response close to that of human tissues and that, more generally, they can also incorporate filters separating the various types of radiation (gamma, beta, neutrons).

In the present invention, we consider a dosimeter whose reading process is based on Optically Stimulated Luminescence or OSL. This technique is quite close to thermoluminescence but the triggering of the luminescence is obtained under the effect of an optical stimulation, unlike thermoluminescence where, by definition, the luminescence is induced by heating the irradiated material.

It is then possible to stimulate the encapsulated material (sheltered from ambient light) using a laser, via an optical fibre, and to recover, still in an optical manner, a luminous energy that is proportional to the dose deposited in the material. It should be noted that the wavelength of the optically stimulated luminescence is always shorter than that of the stimulation light, and this property makes it possible to distinguish this luminescence from any fluorescence that could appear at higher wavelengths. Since this luminous intensity is generally in the visible spectrum, it is easy to measure the signal using, for example, a photomultiplicator.

This technique has an advantage: thanks to this technique, it is possible to determine the dose deposited during a relatively short period (typically several minutes), which makes it possible to finally determine the dose rate. It is thus possible to carry out remote monitoring in real time.

Let us now consider the problems that need to be resolved.

The field of radioprotection is more demanding than elementary radiation detection. This latter mode of detection normally suffices for monitoring nuclear installations, for which the precision required is wide and in which the radionuclides present are usually identified.

In radioprotection on the other hand, it is vital to measure the dose received by the human body and not the dose received by the detection material. In the case where the detection material is fully equivalent to a tissue, which is the case with plastics, no compensation is necessary. However, such materials generally have lower performance for detection than the other materials used, particularly in scintillation or in TL.

Thus, in the general case where the detection material integrates all of the energies without distinction, it is necessary to work back to the dose absorbed by the tissues, using a compensation casing surrounding this material, where this casing is called a "filter" hereafter, so that the response of the dosimeter (in other words the support, the detection material and filter assembly) is representative of the biological effects induced by the radiation. This is applicable to all dosimeters for which the energies of the photons are not, a priori, known.

Personal dosimeters are covered by various norms. The norm that is the most representative of such dosimeters is the CEI 61066 Norm, dedicated to thermoluminescence dosimetry systems for individual and environmental monitoring.

Apart from the stability (particularly as regards the temperature, the sensitivity to ambient light, the stability of information and the zero reset), the linearity and the reproducibility of the measurements obtained with such a system, the text relating to this norm specifies, in particular, that the system must attain a minimum detection threshold of 10 $\mu$Sv, a photon energy response (between 15 keV and 3 MeV) that must not differ from the conventional true value by more than 30%, a beta radiation energy response that must not vary by more than 30% for maximum energies varying from 500 keV to 3 MeV and an angular response (for the photons) that must not exceed 15% on ±60° compared to the normal incidence of the sensor, for a photon energy of 60 keV.

Finally, the response to neutrons must not exceed 1% of the response to photons. This sets a limit to the acceptable neutronic flux, knowing the detector's sensitivity to neutrons. Nevertheless, in practice, the exposure to the neutron flux is low, except in very specific cases. Similarly, a sensor complying with the preceding norm is not directly adapted to uses in particle accelerators where the electronic energies are well above 1 MeV.

The compensation is more difficult the more the atomic number, designated Z, of the material differs from the Z of human tissue (near to 7.2). In the present invention, one uses for example, as detection material, a crystal of alumina in the α phase.

The principle of compensation depends on the detection material and its geometry. The principle of compensation that is described hereafter is adapted, as such, to all materials of Z close to 10, such as alumina or silica. This principle of compensation may, however, be transposed to other materials by modifying the geometric parameters of the materials that are represented.

Thus, the problems that need to be resolved in designing an optical fibre dosimeter, which operates through thermoluminescence, optically stimulated luminescence or radiophotoluminescence, adapted to the needs to radioprotection for the measurement of the parameter designated Hp (10) (percentage depth dose) and in accordance with the CEI 61066 norm are as follows:
- to obtain a very high operational monitoring angle
- good light collection, in order to increase the detection sensitivity (detector—optical fibre interface)
- photon energy compensation for a range of energy going from 15 keV to 3 MeV
- beta radiation energy compensation up to maximum energies of 500 keV to 3 MeV
- an integrated compensation housing, which can be transported to the end of an optical fibre and whose diameter is less than 15 mm, in order to allow inspections in places that are inaccessible to conventional sensors.

STATE OF THE PRIOR ART

In the case of photon-matter irradiation, the photons first of all interact according to three primary processes: the photo-electric effect, Compton diffusion and the creation of pairs. Their respective interaction cross sections vary according to the energies of the photons and the Z of material that is traversed.

The cross section of the photo-electric interaction is proportional to $Z^x(h\nu)^p$, where Z is the atomic number of the material and hν the energy of the incident photon, with $4<x<5$ and $-3.5<p<-1$. This phenomenon is predominant at low energies and is the cause of the high over-response that is observed. When the material is composed of several simple elements, the equivalent atomic number is defined by geometric weighting. Through misuse of language, the effective Z of the matter is called $Z_{eff}$.

For example, the effective Z of magnesium sulphide in the photoelectric field is 14.5 and thus close to that of silicon (14), whereas the $Z_{eff}$ of alumina is around 10.2. As for human tissue, the $Z_{eff}$ is around 7.2.

The second primary interaction concerns the Compton diffusion of gamma photons on the electrons, whose cross section is proportional to the atomic number Z of the medium. The effect is predominant at average energies (typically between 200 keV and 1 MeV).

The phenomenon of creation of pairs only becomes significant at photon energies greater than 5 MeV. In practice, the highest photon energies emitted by the radionuclides are less than 5 MeV. Thus, the two primary processes that come into consideration are the photo-electric and Compton diffusion processes.

After primary interaction, the electrons in turn give up their energy to the material in different ways, by fluorescence, by Auger effect, by Bremsstrahlung or by coulombian collisions. All of these events can occur one after the other. It is therefore necessary to deal with these problems on a statistical basis. The methods used to model these phenomena of energy deposition are based on Monte-Carlo type statistical methods.

The dose received by the material corresponds to the energy deposited in the material by the aforementioned processes, in relation to the mass of the material, and is expressed in grays (J/kg).

Moreover, individual dosimeters must be calibrated in dose equivalent terms Hp(d), in other words in terms of dose equivalents in human tissue at a depth d. In fact, depending on the type of radiation (in other words depending on whether the radiation penetrates a lot or a little), its effects on the human body at the skin level (d=0.07 mm), the eyes (d=3 mm) and the bones (d=10 mm) are different.

One can find oneself in a situation where a single type of radiation is considered (photons X or γ, electrons or neutrons). In practice, these three types of radiation can occur simultaneously, in such a way that it is necessary to separate the different contributions in order to deduce the overall biological effect.

In practice, a large number sensors and filters (up to 6) are necessary in order to isolate the different energy contributions for each type of radiation. If one wishes to design optical fibre sensors, it is desirable to minimise the number of sensors and thus also the number of fibres per measurement point.

The present invention concerns, in particular, a gamma dosimeter that complies with the CEI 61066 norm for the measurement of deep doses Hp (10) in a gamma environment.

In a general manner, this dosimeter must be combined with one or several beta dosimeters, especially for high electron energies (greater than 1 MeV), and a neutron dosimeter in order to be able to deduce the overall flux in the specific conditions of neutronic installations such as nuclear reactors and neutron sources.

Optical absorption dosimeters are known to the prior art. In this regard, the reader should refer to the document (1) that, like the other documents cited later, is mentioned at the end of the present description. The sensor alluded to in this document is described as allowing a dose equivalent to a tissue to be measured and does not comprise a photon energy compensation housing.

Thermoluminescent dosimeters are also known to the prior art. In this regard, the reader should refer to documents (2) to (5), in which there is also no mention of a compensation housing.

Moreover, document (6) describes a device for remotely measuring the dose rate of X-rays. Users of this device are supposed to know the energies of the photons emitted by the irradiation source of the device and the resulting over-response factor, in such a way that no means of photon energy compensation is provided.

Optically stimulated luminescence (OSL) dosimeters are also known to the prior art. In this regard, the reader should refer to documents (7) to (9). In these documents, there is also no mention of a photon energy compensation device.

Document (10) describes another OSL dosimeter, but no compensation housing is described in this document.

Moreover, document (11) describes a remote radiation detection device, but no radiation energy compensation means are provided in this device.

Dosimeters comprising compensation means are also known to the prior art.

In particular, the reader should refer to document (12), which describes a dosimeter using a photographic film. However, such a film does not enable real time measurements to be made. Moreover, the dosimeter is sensitive to temperature, moisture and the angle of incidence of the radiation.

The reader should also refer to documents (13) to (15), which respectively concern a thermoluminescent dosimeter, a radiophotoluminescent dosimeter and a semiconductor dosimeter.

As regards optically stimulated dosimeters, the reader should refer to documents (16) to (20).

In fact, no radiation sensor whose design is similar to that of the devices described in documents (1) to (11) and which incorporate means provided to compensate the energy of the incident photons and the angle of incidence of these photons, as described in documents (12) to (20), is known to the prior art.

DESCRIPTION OF THE INVENTION

The aim of the present invention is to solve this problem by proposing a radiation sensor that can be connected to an optical fibre for remote dosimetry, wherein this sensor enables the energy of the incident radiation, as well as the angle of incidence of this radiation, to be compensated.

In particular, the invention proposes a miniature optical sensor, which is kept away from users by connecting it to an optical fibre, which has a low dose detection threshold and which is capable of compensating the energy of the incident photons (CEI 61066 norm) and working under various angular incidences.

The detection material contained in this sensor is advantageously made out of α alumina, or a silica glass, but other materials may be used by slightly modifying the geometric parameters of the compensation screens that the sensor contains.

This sensor may be connected, via an optical fibre, to a luminescence measuring device that is advantageously optically stimulated but which may also be radiophotoluminescence, or thermoluminescence induced by laser heating.

This luminescence measuring device incorporates means for measuring, in real time, optical losses from the optical transmission fibre in order to compensate any measurement errors induced by curvatures, connection losses, or even the blackening and ageing of this fibre.

More generally, the present invention concerns a radiation sensor for dosimetry, characterised in that this sensor comprises:

at least one element made out of a radiation detection material, wherein this element has first and second extremities and an axis where these first and second extremities meet, and the material is capable of emitting a luminescence radiation and is transparent to this luminescence radiation, and first and second radiation filter screens, wherein the first screen is placed opposite the first extremity of the element and is intended to filter the radiation that reaches the element along a direction adjacent to the axis of the element, the second screen being thicker than the first screen, and this second screen is placed at the periphery of the element and is intended to filter the radiation that reaches the element along a direction adjacent to one that is perpendicular to the axis of the element, whereby this sensor is capable of being optically connected to a flexible light guide, provided to collect and convey the luminescence radiation.

According to a particular embodiment of the sensor according to the invention, the material is capable of emitting luminescence radiation when it is optically stimulated, wherein the sensor is thus an optically stimulated luminescence radiation sensor, and the light guide is moreover provided to convey an optically stimulated radiation from the element and to illuminate this latter element with the optically stimulated radiation.

Preferably, the material has an effective atomic number close to 10.

According to a preferred embodiment of the sensor according to the invention, the axis of the element is an axis of symmetry of revolution for this element.

Preferably, the element is surrounded by a luminescence radiation reflective layer, for example an aluminium film.

According to a first particular embodiment of the sensor according to the invention, the element has a drawn out shape along its axis and a cylindrical shape revolving around this axis and the sensor comprises, in addition, a luminescence radiation reflector, wherein the first screen is placed between this reflector and the first extremity of the element, and the second extremity of the element is intended to be optically coupled to the light guide, the second screen stretching out along the length of the element from the second extremity, whereby this length is dependent on the geometry of the element.

According to a second particular embodiment, the sensor comprises one or a plurality of elements made out of radiation detection material, a body comprising a cavity in which the element or the plurality of elements is located and thus the wall is capable of reflecting the luminescence radiation, as well as a part comprising a boring whose axis is the axis of the element or the plurality of elements and thus the wall is capable of reflecting the luminescence radiation, this part being provided to collect this latter radiation and to convey it to the entry of the flexible light guide, under an angle that is compatible with the numerical aperture of this flexible light guide, when this guide is coupled to the sensor.

The boring preferably has a conical shape.

The sensor may comprise, in addition, a focalisation lens between the element or the plurality of elements and the boring in the part.

The radiation detection material may be selected among the group comprising phosphate type radiophotoluminescent glasses, photo-chromic type luminescent glasses, crystalline radiation detection materials, in particular alumina in the a phase, scintillating crystals and crystals capable of emitting an optically stimulated luminescence.

The present invention also concerns a dosimetry device comprising the sensor according to the invention, a laser capable of emitting a stimulation radiation from the element made out of radiation detection material and means for detecting the luminescence radiation emitted by this element.

According to a particular embodiment of the dosimetry device according to the invention, this device comprises in addition a first photo-detector, a reflector capable of allowing at least 10% of the radiation emitted by the laser towards this first photo-detector to pass through and allowing more than 90% of this radiation to be reflected towards the flexible light guide and a second photo-detector intended to detect the luminescence radiation emitted by the element and conveyed by the flexible light guide, whereby the ratio of signals provided by the first and second photo-detectors allows the variations in the stimulation radiation transmitted to the element to be measured each time this is interrogated.

BRIEF DESCRIPTION OF THE DRAWINGS

The present invention will be better understood on reading the description of the following examples of embodiments, which are only given by way of indication and are in nowise limitative, and by referring to the annexed drawings in which.

DETAILED DESCRIPTION OF SPECIFIC EMBODIMENTS

An example of an X-ray or gamma ray sensor according to the invention, which can be moved away from users by connecting it to an optical fibre, has an improved detection threshold compared to the known sensors, mentioned above, for which the threshold is around 1 mGy.

It concerns an OSL sensor that uses a transparent detection material in order to increase the optically sounded detection volume, as described in document (11).

However, unlike this document (11), the response of this sensor to a dose is compensated vis-a-vis the photon energies in such a way that it is not necessary to know, a priori, these energies, or even the spectrum of these photons, to use this sensor, which is the case with most radioprotection applications.

The optoelectronic dosimetry device, to which this sensor is connected, uses a technique for compensating line losses that makes it possible to correct the influence of an optical loss on the measurement of the OSL signal, or even to set off an alarm if the losses are too high.

For human dosimetry, this sensor according to the invention allows detection independent of the energy of the photons (from 15 keV to 3 MeV) according to an angular aperture as wide as possible (at least ±60°). The operational solid angle for the sensor is 2π (1-cos B) where B is the aperture semi-angle. The total space corresponds to 4π steradians.

The norm refers to flat sensors on the market in which the aperture angle is at least ±60° (solid angle equal to π steradians). Flat sensors are thus operational on a solid angle of 2π on their two faces.

The OSL sensor according to the invention allows an angular measurement on around ±155° to ±180° by cylindrical symmetry around the axis of the sensor. The corresponding solid angle is around 3.8×π (95% of the total space), which corresponds to a better angular performance compared to what exists presently on the market for relative compensated dosimeters (RPL, TL, OSL).

The following table gives the solid operational angles for various sensors and allows a comparison to be made of the angular aperture performance of equivalent-tissue dosimeters or which comply with the CEI 61066 nrom.

| Sensor | Angles | Solid angle |
|---|---|---|
| Chamber | ±180°; ±180° | 4.π |
| Flat sensor (e.g. TLD, RPL) | ±60°; ±60° | 2.π |
| OSL sensor | ±180°; ±155° | 3.8.π |

Two particular embodiments of the radiation sensor according to the invention are proposed hereafter, which can be connected to an optical fibre and which are designed to compensate the incident photon energies and the incidence angles of these photons.

Figure 1:
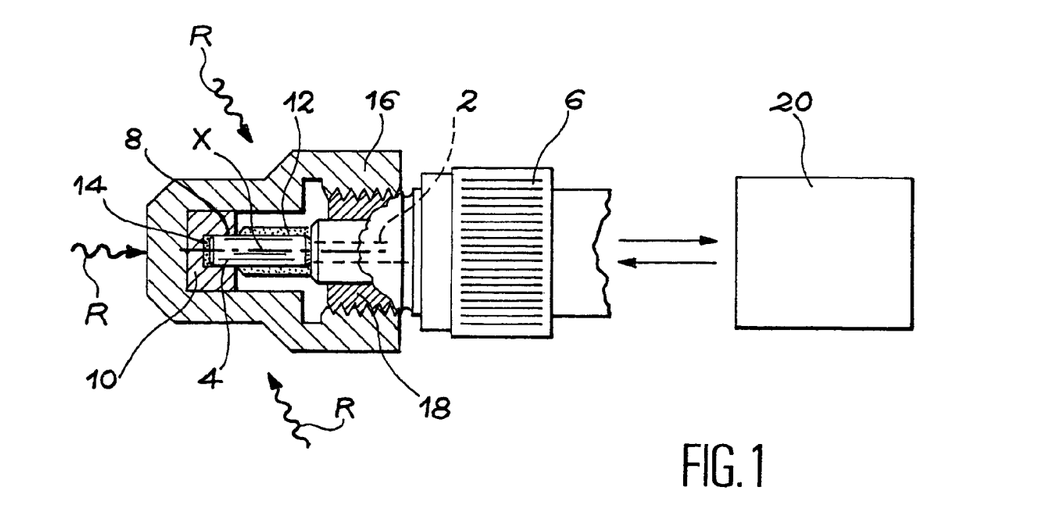
FIG. 1 is a schematic view of a first particular embodiment of the radiation sensor according to the invention, connected to the end of an optical fibre and enabling the dose Hp (10) to be measured.
Figure 4:
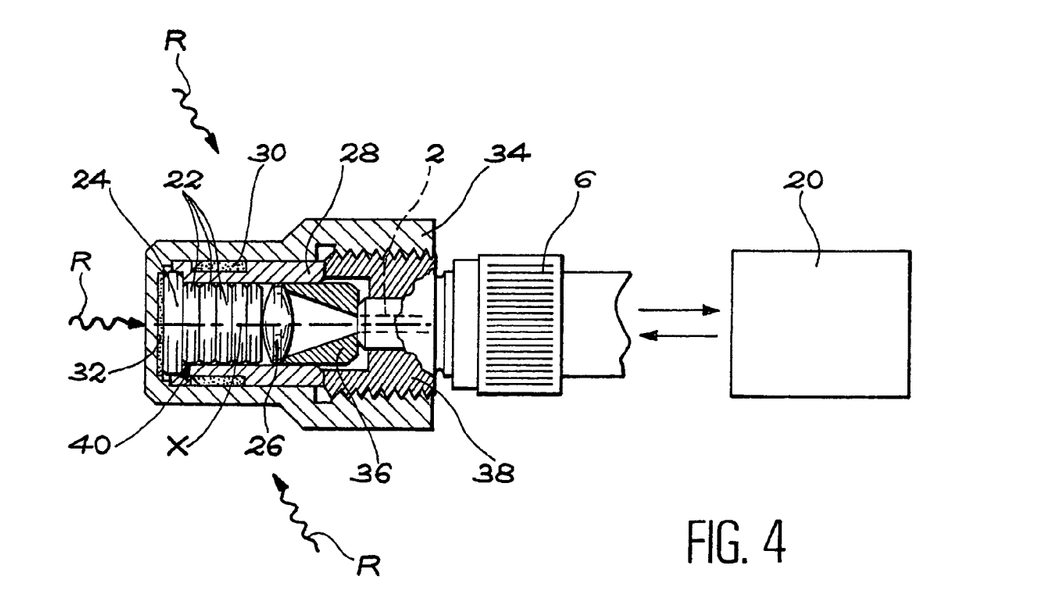
FIG. 4 is a schematic view of a second particular embodiment of the radiation sensor according to the invention, connected to the end to an optical fibre.

The examples given referring to FIGS. 1 and 4 comprise means for reflecting stimulation light (for example, aluminium film or mirror), allowing the light to interact a large number of times, through multiple reflections, in order to reduced the time for zero resetting of the radiation detection material. In all of these examples, the sensors are made light tight to ambient light.

All of the compensation means described are designed to be applied to Optically Stimulated Luminescence dosimetry. They can however be transposed to other modes of dosimetry using the same material (for example, alumina) and particularly to thermoluminescence.

Moreover, the materials used in the examples in FIGS. 1 and 4, particularly those that make up the screens, can be modified.

The means of compensation described use screens in the form of tin tubes (12, 30) without perforations, whose coverage coefficient is selected to meet the compensation norm: this coefficient is around 6/10 to 7/10, depending on the geometry of the crystal.

This determining value is calculated through modelling with the help of software using a Monte-Carlo method (MCNP, EGS4, Penelop), and not taking the hypothesis according to which all of the energy of the electrons is deposited in the crystal. It is necessary to make a complete electronic evaluation, particularly by taking account of the secondary electrons. The value obtained by calculation is validated or adjusted by several tests.

It is also possible to use screens, for example in lead or indium instead of tin screens. However, tin is preferable, since it does not have X absorption peaks (K band) in the compensated energy field.

Moreover, it is possible to use screens in the form of perforated tubes of the kind used for filtering operations and which are, for example, commercialised by the Arcor Inc. and Perforated Tubes Inc. companies. The ratio of the non-perforated surface to the total surface of a tube then corresponds to the coverage coefficient described above. The perforated tubes then cover the whole of the detection material.

The example in FIG. 1 concerns a sensor using a direct coupling between the optical fibre and the detection material.

The sensor in FIG. 1, of cylindrical symmetry (around the axis X of the optical fibre 2), incorporates a detection crystal 4 (or an assembly of detection crystal), for example in alumina, forming a cylinder revolving around the axis X. The assembly shown in FIG. 1 is designed for a detection crystal 5 mm long and with a diameter of 1.5 mm.

Fibre 2 is advantageously a silica fibre of 1 mm diameter and numerical aperture of around 0.5, with the air-silica acceptance semi-angle thus being around 30°. Purely by way of indication and in nowise limitative, this fibre is the fibre commercialised under the reference TECS48 by the 3M Company and its extremity is fitted with a connector 6 according to the standard called SMA. This connector 6 is fastened to the sensor, as can be seen, but this sensor can be separated from the connector and thus the optical fibre when necessary.

The optically stimulated luminescence (or even thermoluminescence or scintillation or radiophotoluminescence) is returned along the optical fibre 2 after reflection on the metallic film 8, advantageously made out of aluminium and around 50 micrometers thick, which is coiled around the crystal 4. This film 8 also makes it possible to reduce the quantity of secondary electrons reaching the crystal as well as the number of recoil particles in the case of a neutronic flux.

The sensor in FIG. 1 thus comprises a cylindrical crosspiece 10 made out of plastic material, for example polycarbonate, whose axis is the axis X and which is designed to guide the detection crystal. This crosspiece bears a cylindrical tubular screen 12 of axis X, made out of tin, around 0.5 mm thick, making it possible to carry out energy compensation for the irridiations R substantially perpendicular to the axis X of the sensor.

This cylindrical screen 12 covers around 7/10 of the crystal 4, in other words a length of 3.5 mm.

Similarly, a tin screen 14 in the form of a disc of around 0.2 mm thickness and the same diameter as the crystal 4 is placed between the crosspiece 10 and this crystal in order to provide the compensation for the irradiations R whose angular incidences are near to the axis X.

It is also possible to add a flat round mirror (for example, aluminised) between the tin screen 14 and the crystal 4.

The sensor is assembled by first placing the cylindrical screen 12 on the crystal as shown in the figure. This positioning is facilitated by the fact that tin is a very ductile metal. The crystal is then inserted into the crosspiece 10, and this crosspiece is inserted into the body 16 of the sensor. This body is machined out of a thermosetting polymer, for example a polycarbonate type polymer, doped to be opaque to ambient light.

It goes without saying that this body must tone down as little as possible the radiation to be detected.

The crystal is then blocked by a screwed fitting 18, for example in stainless steel, whereby this fitting receives the extremity of the connector 6 (bearing the extremity of the fibre 2) and is fastened and thus screwed into the body 12 of the sensor.

The mechanical contact is exerted by the connector directly on the crystal by an index matching liquid in order to limit the optical losses by Fresnel reflection.

After assembly of the sensor and fastening of this sensor to the connector 6, the OSL signal sent back by the sensor is calibrated in relation to one or several radiation sources whose activities are known.

As can be seen in FIG. 1, means 20 are provided to create a stimulation radiation of the crystal (transmitted to the crystal by the optical fibre), detect the luminescence of the crystal thus excited, transmitted to the means 20 by the fibre, and to analyse this luminescence.

Figure 2:
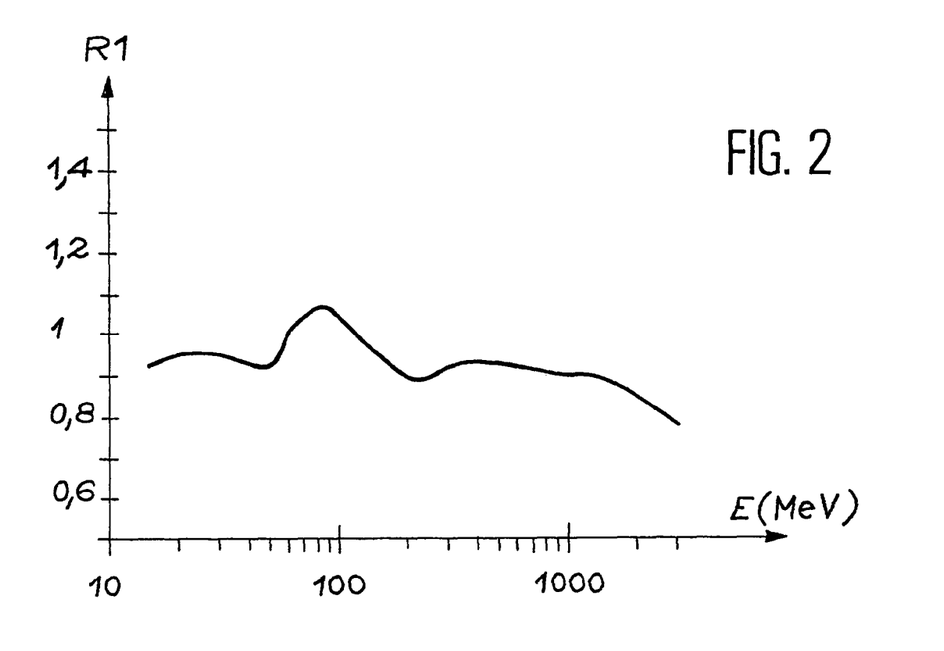
FIG. 2 shows the response R1 of the sensor in FIG. 1, in relation to $H_p$ (10), as a function of the energy E of the photons (in MeV), for an incidence that is perpendicular to the axis of the sensor.

The response of this sensor relating to the percentage depth dose was calculated by a Monte-Carlo type code and is shown in FIG. 2 as a function of the energy of the photons, for an irradiation perpendicular to the axis X of the sensor.

The sensor in FIG. 1 makes it possible to carry out an energy compensation on a range of photonic energies going from less than 15 keV to 3 MeV, since the difference in the response of the sensor in relation to the response calibrated with a source of 60Co (or 137Cs) does not exceed ±30%.

Figure 3:
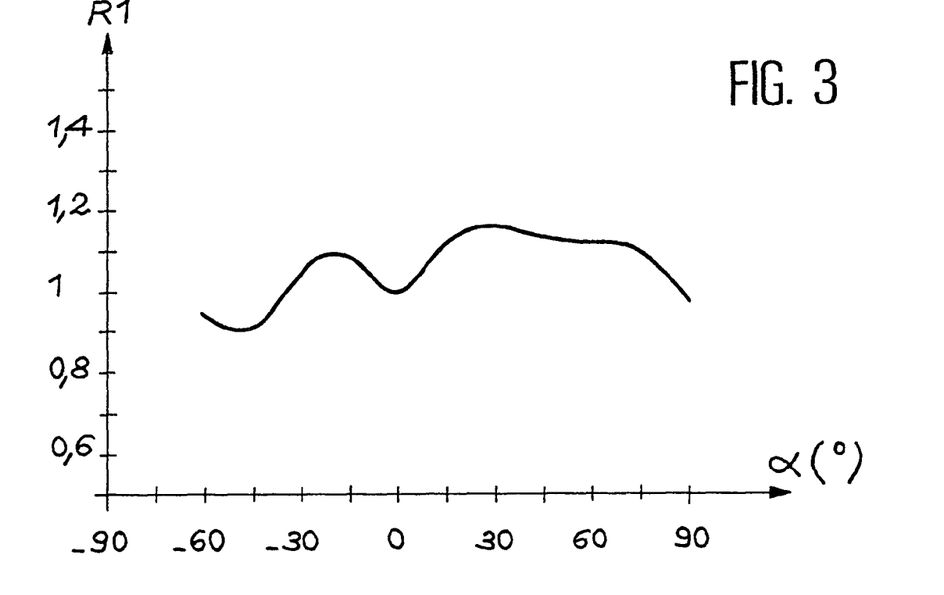
FIG. 3 shows the response R1 of the sensor in FIG. 1, in relation to $H_p$ (10), as a function of the angle of incidence α of the radiation (in degrees) for 60 keV photons.

Similarly, FIG. 3 shows the angular dependence of the sensor for a photonic energy of 60 keV (CEI 61066 norm). The energy compensation complies with this norm (stable response to within about ±15%) for an incidence angle varying from 90° (incidence along the axis X f the fibre) to −60° in counting here the angle of incidence in relation to a direction that is perpendicular to the axis X.

The angular aperture allowed by this sensor is thus ±150°. Only a semi-angle of 30° corresponding to the fitting 18 and the connector 6 of the fibre is not covered. The corresponding total solid angle is equal to 3.74 ×π steradians, in other words 93.5% of the total space.

The example in FIG. 4 concerns a sensor using an indirect coupling between the optical fibre and the detection material.

As in the case of FIG. 1, the sensor in FIG. 4 also has cylindrical symmetry around the axis, again designated X. It incorporates one or several detection crystals (for example, in alumina) that are also cylindrical shape: a continuous crystal or an assembly of crystalline pellets (case of FIG. 4) is used.

The assembly represented in FIG. 4 is for a crystal or an assembly of crystalline pellets 5 mm long and with a diameter of 5 mm.

The extremity of the optical fibre 2 is also fastened into a connector 6 (as in the case in FIG. 1). The optically stimulated luminescence is sent back along the optical fibre via a mirror 24, which may be an aluminised or silvered mirror or even a multilayer dielectric mirror (at 420 nm) and a converging lens 26, for example bi-convex.

It can be seen in FIG. 4 that the assembly of pellets 22 is located between the mirror 24 and the lens 26, where this lens is on the side of the extremity of the fibre 2. The light collection mode is via focalisation, in a single point in the fibre, of the light coming from all the points within the "crystal" (or more exactly, from the assembly of crystalline pellets 22) but along identical angular incidences.

The sensor comprises a cylindrical crosspiece 28 made out of plastic material, for example polycarbonate, which makes it possible to block the mirror 24, to guide the detection pellets 22 and to support a cylindrical tubular tin screen 30, around 0.7 mm thick, along axis X, enabling the compensation in energy for the irradiations R substantially perpendicular to the axis X of the sensor.

This cylindrical screen 30 covers around ⅗ of the assembly of pellets 22, in other words a length of 2.9 mm. Similarly, a tin screen 32 in the form of a disc around 2 mm thick and the same diameter as the mirror 24, is placed between the body 34 of the sensor and this mirror 24.

The sensor in FIG. 4 is assembled by firstly placing the tin screens 30 and 32 in the interior of the housings provided for this purpose in the body and the crosspiece. The mirror 24 is then inserted into a housing provided for this purpose in the crosspiece. This crosspiece, fitted with the mirror, is then inserted into the body of the sensor, for example in polycarbonate.

One then inserts the "detection crystal" (assembly of pellets 22), the lens 26 made out of, for example, BK7 glass and an injection cone 36, for example in aluminium, or more precisely a part 36 provided with a conical boring along axis X and placed behind the lens 26 so that it is positioned between this lens and the extremity of the fibre, the boring being designed to direct the luminescence from the pellets, focalised by the lens, towards the extremity of the fibre.

The assembly obtained is then blocked by a screwed fitting 38, for example made out of stainless steel, this fitting receiving the extremity of the connector 6, for example, SMA type (bearing the extremity of the fibre) and it being fastened and thus screwed into the body 34 of the sensor.

The same fibre 24 is used as in the example in FIG. 1.

It is desirable to coat the detection crystal (assembly of pellets 22) with a sheet or film of aluminium 40 around 50 pm thick in order to reduce the flux of secondary electrons emitted by the filters formed by the tin screens and to increase the proportion of light sent back towards the fibre.

It is possible to remove the lens 26 and to collect the light directly through the injection cone 36. This method of light collection is complementary to the method described previously in the sense that the light injected into the fibre comes from all points within the interior of the crystal, or the assembly of pellets 22, but along variable angular incidences.

Due to the principle of conservation of geometric scope, both methods can be used.

The use of the lens 26 nevertheless enables good recoupling, in the fibre, of the light reflected by the flat mirror 24.

Whatever method is used, all of the light emitted cannot be collected in one go and it is advantageous to metallise, for example by a film of aluminium, the interior of the crosspiece 28 in order to increase the collection of light by multiple reflections.

Figure 5:
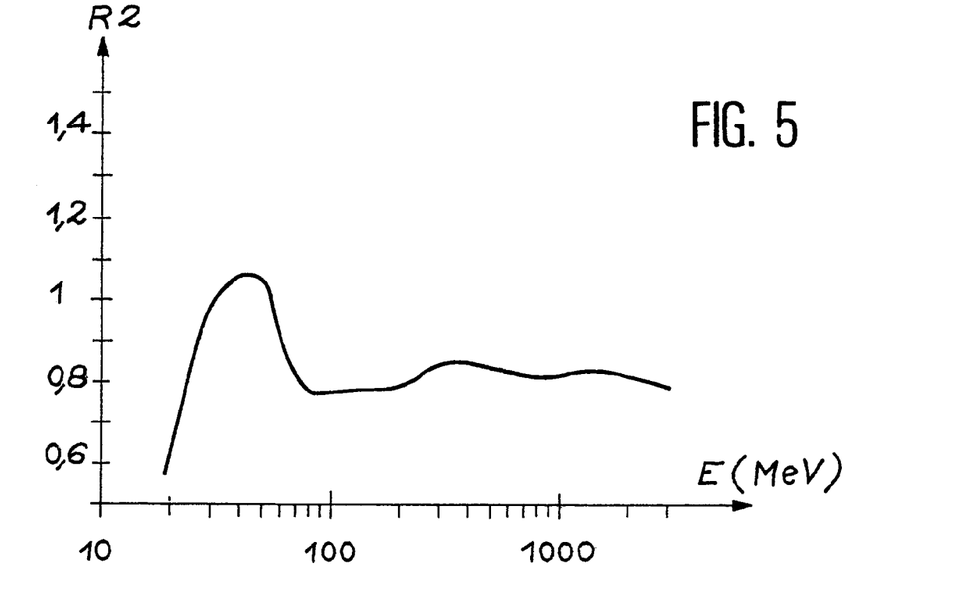
FIG. 5 shows the response R2 of the sensor in FIG. 4, in relation to $H_p$ (10), as a function of the energy E of the photons (in MeV), for an incidence that is perpendicular to the axis of the sensor.

The response of this sensor relating to the percentage depth dose was calculated by a Monte-Carlo type code and is shown in FIG. 5 as a function of the energy of the photons, for an irradiation perpendicular to the axis X of the sensor.

The sensor in FIG. 4 makes it possible to carry out an energy compensation on a range of photonic energies that goes from less than 20 keV to 3 MeV, since the difference in the response of the sensor in relation to the response calibrated with a source of 60Co (or 137Cs) does not exceed ±30%.

For this sensor, the photonic energy compensation in fact extends a lot further than 3 MeV and exceeds the requirements of the norm.

Figure 6:
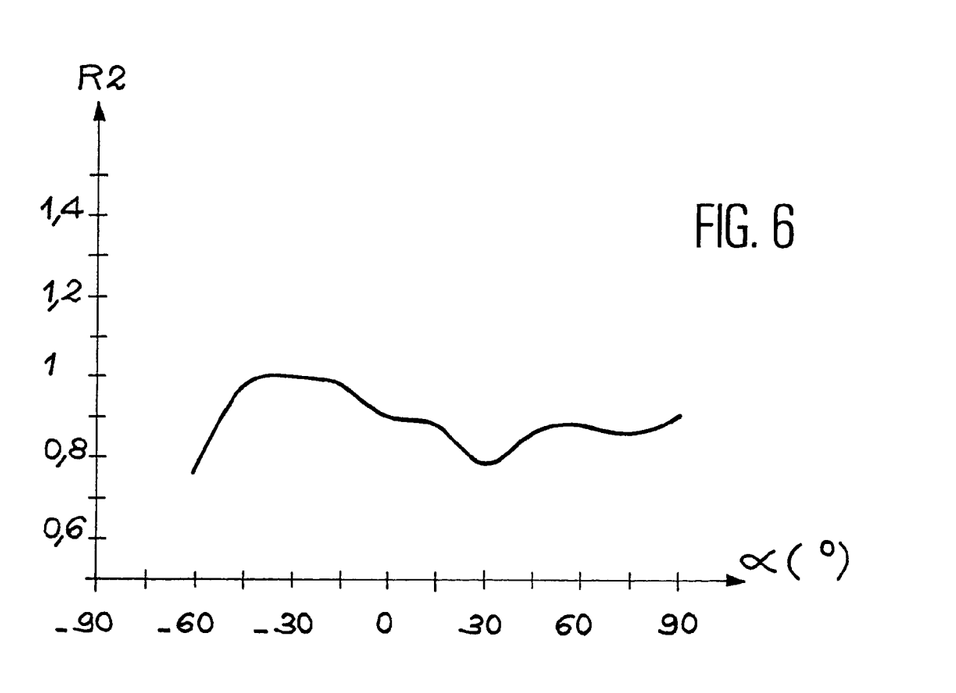
FIG. 6 shows the response R2 of the sensor in FIG. 4, in relation to $H_p$ (10), as a function of the angle of incidence α of the radiation (in degrees) for 60 keV photons.

Similarly, FIG. 6 shows the angular dependence of the sensor for a photonic energy of 60 keV. The energy compensation complies with the CEI 61066 norm (stable response to within about ±15 %) for an incidence angle varying from 90° (incidence along the axis X of the fibre) to −65°.

The angular aperture allowed by this sensor is thus ±155°. Only a semi-angle of 25° corresponding to the fitting 38 and the connector 6 of the fibre is not covered. The corresponding total solid angle is equal to 3.8 ×π steradians, in other words 95% of the total space.

The sensors according to the invention in FIGS. 1 and 4 are optimised for photonic irradiation and also have a response to the beta radiation likely to occur in certain industrial applications.

Figure 7:
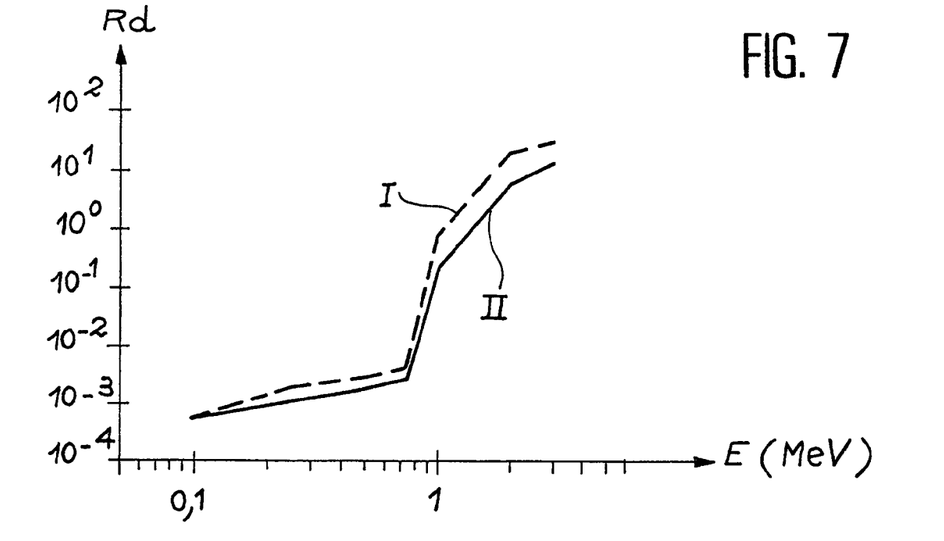
FIG. 7 shows the variations in the ratio Rd of the dose deposited by electrons to the dose deposited by gamma photons, as a function of the energy E (in MeV), for the sensor in FIG. 1 (curve I) and for the sensor in FIG. 2 (curve II), at constant number of particles.

Each of the gamma sensors placed in a mixed beta-gamma irradiation field has a cross-sensitivity to beta radiation, the proportion of which is represented in FIG. 7.

Up to beta radiation energies of around 800 keV, the dose deposited by an electron is around 1 thousandth to 2 thousandths of the dose deposited by a photon with the same energy.

It follows that if these sensors are placed in a mixed irradiation field, with equivalent beta-gamma activities, it is possible to ignore the electronic influence up to energies of around 800 keV, since the electronic sourced perturbation is weaker or of the same order of magnitude as the measurement accuracy of the dosimeter.

This threshold corresponds, on the one hand, to the energy necessary for an electron to cross through the polycarbonate wall and, on the other hand, corresponds to a significant increase of Bremsstrahlung of the electrons. On the other hand, this electronic influence must be taken into account if the electronic energy exceeds 800 keV or if the beta activity is more than 100 times higher than the gamma activity.

In this case, in addition to the gamma radiation sensor, one or several other beta radiation sensitive sensors must be used in order to substract this influence. This sensor must then be energy compensated in relation to the percentage depth dose and superficial dose and the description of such a sensor does not come within the scope considered in document (12).

Returning to the sensors in FIGS. 1 and 4, it should be pointed out that the optical fibre 2 can be assembled on such a sensor or separately from this sensor as desired, thanks to the connector combined with the fitting 18 or 38.

The reflective film (8 or 40) may be coiled around the crystal (4 or 22) or deposited under vacuum.

Figure 8:
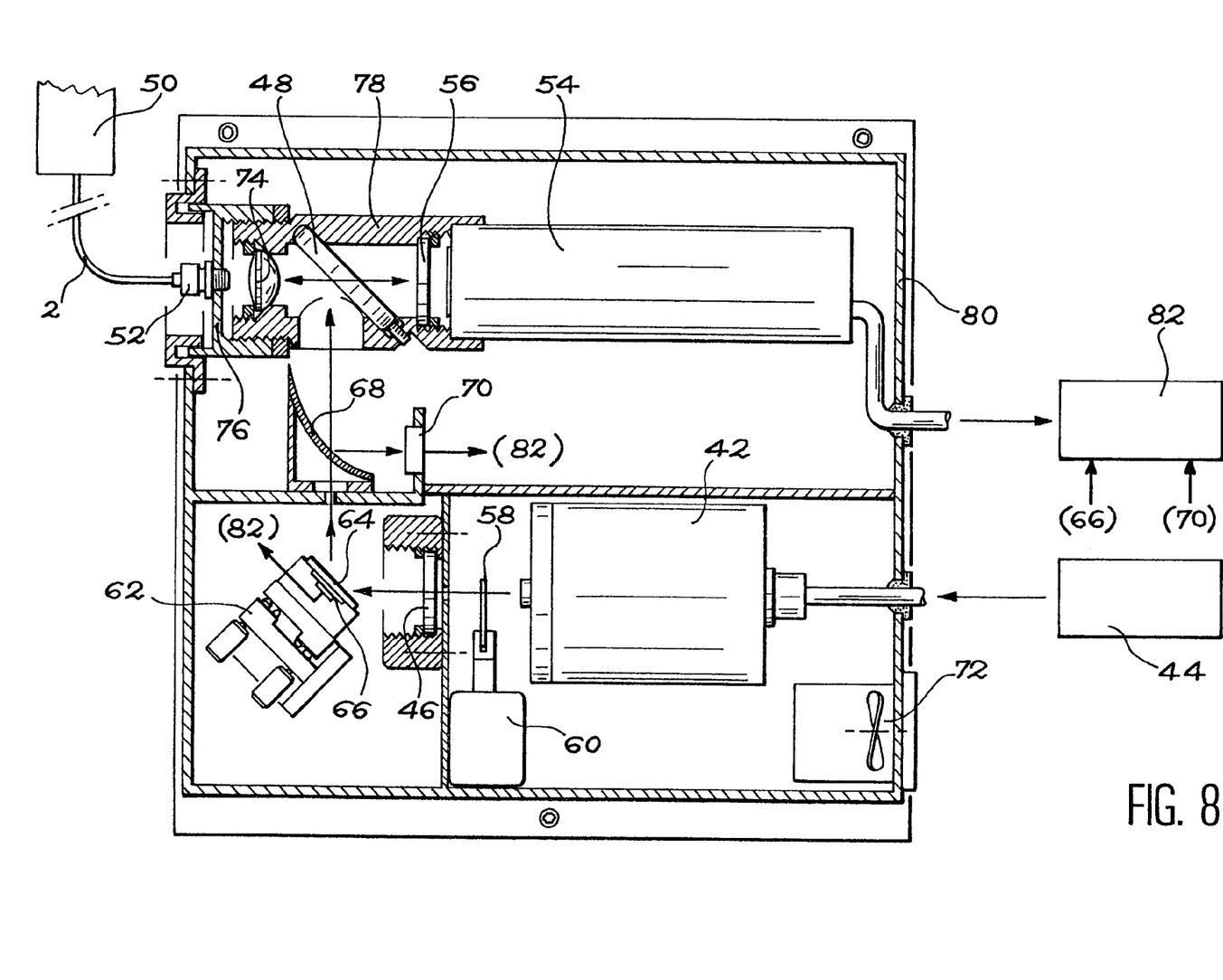
FIG. 8 is a schematic view of a particular embodiment of the dosimetry device according to the invention.

We will now describe a particular embodiment of the dosimetry device, according to the invention, while referring to FIG. 8.

In practice, compensation is all the harder to attain the more the Z of the detection material differs from the Z of human tissue (near to 7.2). The compensation scheme is therefore dependent on the detection material.

In the example under consideration, the detection material is a crystal of alumina in α phase, which has an excellent OSL sensitivity (see documents (17) to (20)), good optical transparency, making it possible to ensure good light collection, an effective Z of around 10 and very low fading at ambient temperature. Moreover, the alumina crystal is widely used in dosimetry and its production costs are low.

The principle of compensation may be applied to other materials with equivalent Z values, such a silica, but may also be transposed to different materials by adapting the geometrical parameters of these materials (especially the thickness of the screens and the coverage rate of the peripheral screen).

The dosimetry device or opto-electronic Optically Stimulated Luminescence reading system, which is schematically shown in FIG. 8, is similar, in its principle, to the systems described in references (3) to (7).

This system, which operates in continuous mode, comprises essentially a double frequency YAG laser (at 532 nm), which is given reference 42 in FIG. 8 and which is controlled by appropriate means 44, an assembly 46 of filters that enable in particular the wavelengths situated in the ultraviolet and in the infrared (at 1064 nm) to be eliminated, and a dichroic blade 48.

This allows, on the one hand, the stimulated light (at 532 nm), emitted by the laser 42, to be sent back towards the sensor 50, of the same type as the sensor in FIGS. 1 or 4, via the optical fibre 2 provided at its other extremity with another connector 52 allowing it to be connected to the dosimetry device and, on the other hand, to transmit the optically stimulated luminescence (at 420 nm), from sensor 50 towards a photo-detector 54, for example a photomultiplicator, through an assembly of low pass filters 56 (allowing the residual laser light to be eliminated).

Advantageously, the optical fibre 2 is a silica fibre with a diameter of 1 mm and high numerical aperture (typically 0.5). It allows the sensor 50 to be moved away, by a few tens of meters, from the dosimetry device. Typically, at a distance of 20 meters, the stimulation light is attenuated by a factor of 2 whereas the OSL signal is attenuated by a factor of 10.

It has been observed experimentally that the zero reset of the material requires an energy density of around 100 J/cm$^2$. This energy density is obtained by an exposure of 50 mW on a diameter of 5 mm for 5 minutes.

Since the detection material is transparent, it is profitable to pass the stimulation beam several times in the material in order to reduce the stimulation power required and the zero reset time.

The device in FIG. 8 comprises, in addition, a compensation device for optical losses in the line (these losses can be induced by curvatures, degradation of connectors, or by blackening of the optical line due to the irradiation) and a beam control device comprising a shutter 58 and an electromagnet 60 for controlling this shutter.

The compensation device comprises a mechanical assembly that can be adjusted angularly 22, bearing a semi-reflective mirror 64 placed in front of a photodiode 66 and which picks up part of the stimulation signal (typically 5%)

The remaining beam (typically 95% of the stimulation signal) passes through an off-axis parabolic mirror 68, enabling the stimulation light to be collected after going forwards and backwards via the optical fibre 2 and focalising it on another photodiode 70.

It is thus possible to shape the ratio of the signal collected by the photodiode 70 to the signal collected by the photodiode 66 and thus deduce the transmission of the line while the device in FIG. 8 is being used.

By comparison with a transmission value measured during the dose calibration of the device (transmission of the line at zero time), it is possible to correct the influence of optical losses induced by the measurement line on the remote measurement of the dose.

Moreover, it should be pointed out that FIG. 8 shows a ventilator 72 whose purpose is to cool the device, a lens 74 enabling focalisation, on the extremity of fibre 2, of the light coming from the dichroic blade 48, a baffle 76 for adjusting the focalisation of the light in the fibre while at the same time ensuring light tightness, a centring support 78 for supporting and self-centring the components 52, 74, 54, various means of support, if necessary adjustable, for the components of the device in FIG. 8, in particular a casing 80, and means 82 for processing the signals supplied by the photomultiplicator 54 and the photodiodes 66 and 70, particularly to calculate the aforementioned ratio.

It can be seen in particular in FIG. 8 that an optical screen is formed around the laser 42 and only allows to pass, thanks to a hole provided for this purpose, the laser beam intended to cross through the assembly of filters 46 (when the shutter 58 is open).

At time $t_0$, the dosimetry device fitted with its sensor 50 is calibrated in relation to a source whose energy and activity are known. The ratio Iret/Im is known at zero time where Iret and Im are determined after calibration.

If the device is not opened and modified in the meantime, any subsequent modification (in operation) of this ratio leads to a modification in transmission (forwards and backwards) between the casing 80 and the sensor 50. The transmission is therefore estimated by the ratio:

$$T^2 = \frac{(Iret/Im)}{(Iret/Im)_{t_0}}$$

By way of example, a transmission loss of 10% results in a transmission factor T of 0.9.

Moreover, the OSL signal is measured either by marking off the amplitude of the peak or by integrating the whole of the curve. This second option is preferred because the integral of the signal (energy deposited) is independent of the power of the stimulation laser and the statistic is better (higher number of hits per minute).

On this signal is superimposed a continuous background signal composed in part of a non-filtered luminous background and thermal noise from the photodetector 54. This continuous background signal, called "offset" hereafter, is measured after the laser pulse and subtracted from the signal I (t) captured by the photodetector 54. The value of the dose is deduced from the integration of this signal corrected in this manner, weighted by a calibration factor C (in mGy/cps) and by the transmission factor T according to the formula:

$$\text{Dose} = \frac{C \cdot \int (I(t) - \text{offset})dt}{T}$$

Figure 9:
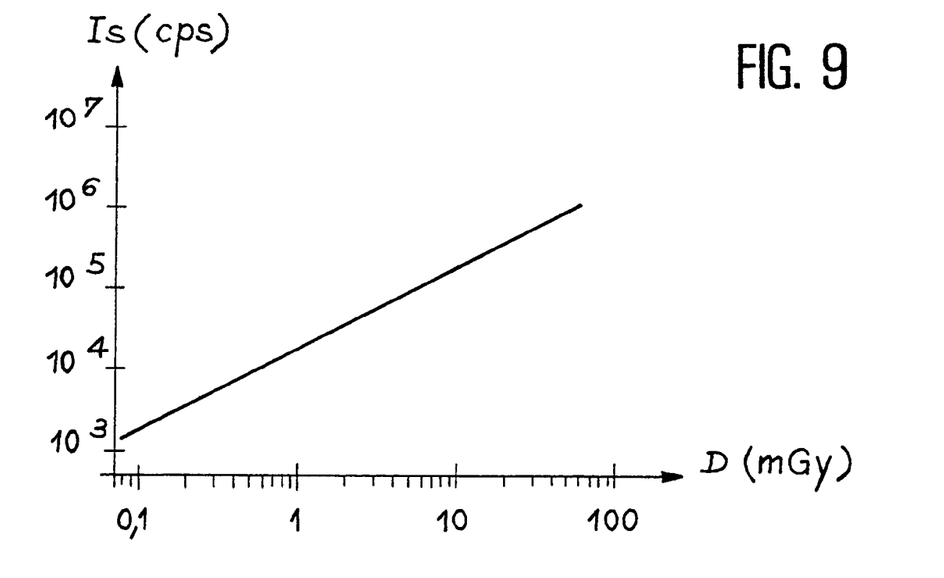
FIG. 9 shows the variations in the integral Is of the OSL signal (in hits per second) as a function of the gamma radiation dose D (in mGy), for the device in FIG. 8 connected to a sensor of the kind in FIG. 4 via a 20 m long optical fibre made out of silica.

FIG. 9 shows the linearity and the reproducibility, as a function of the dose D, of the response Is of the dosimeter. The device described experimentally has a detection limit of around 50 $\mu$Gy for a fibre length of 20 meters.

The accuracy becomes less and less good as the dose decreases because the counting statistic is less than good. By way of example, the relative error relating to the dose measurement is around ±15% at 0.1 mGy.

Applications of the present invention are described below.

Optical fibre sensors according to the invention, rendered remote by optical fibre, can be used for radiation detection and radioprotection.

As regards radiation detection, they may be used for example for monitoring the clean up of nuclear sites.

By way of example, they can be inserted into small diameter pipes (typically 10 mm to 15 mm according to the designs), thus allowing activity measurements to be taken in real time, in zones that are inaccessible to conventional sensors.

They can also be left in place and remotely interrogated, at set or variable times, for the detection of accidents (radioactive leaks, for example).

However the ideal application for compensation in energy and angular incidence is radioprotection for monitoring personnel working with radiation. The interest of a sensor according to the invention is due to its very wide operational angle (±150°, i.e. 95% of the total space).

Such a sensor can then be worn by an operator in the nuclear sector in order to monitor, at periods chosen by the radioprotection service, the dose received by this operator.

This type of sensor may also be used in medical radiography.

Apart from applications in the nuclear sector, these compensated sensors can find applications in radiotherapy, for example in external or in-vivo monitoring of localised doses on cancerous tumours in a patient receiving irradiation (very high localised dose rate, around several grays per minute).

The physician can then follow changes in the dose received by the tissue (whatever the photon energies used and whatever the energy spectrum) and can optimise the irradiation of the tumour in real time, and carefully handle the surrounding tissue.

These sensors also make it possible to monitor the doses received on the hands by a surgeon operating under X-rays, whatever the X-ray energy used, which can be more or less penetrating.

The documents cited in the present description are as follows:
(1) F. Hasing, F. Pfeiffer, H. Büker, WO 97/21112.
(2) A. Huston, B. Justus, U.S. Pat. No. 5,606,163
(3) A. L. Huston, B. L. Justus, T. L. Johnson, Appl. Phys. Lett., 68 (24), 1996, pp. 3377–3379.
(4) B. Justus, A. Huston, U.S. Pat. No. 6,140,651
(5) P. F. Braunlich, W. Tetzlaff, J. E. Hegland, S. C. Jones, U.S. Pat. No. 4,999,504
(6) K. A. Spanswick, U.S. Pat. No. 5,905,262
(7) P. K. Soltani, Ch. Y. Wrigley, G. M. Storti, R. E. Creager, Fiber Optic radiation dosimetry, SPIE, vol. 1169, Fiber Optic and Lasor Sensors VII, 1989, pp. 540–551.
(8) R. E. Creager, P. K. Soltani, U.S. Pat. No. 5,091,653
(9) J. Lindmayer, C. Y. Wrigley, U.S. Pat. No. 5,030,834
(10) B. L. Justus, Rad. Prot. Dos., vol 81, n°1, 1999, p. 5
(11) J. C. Thèvenin, U.S. Pat. No. 5,640,017 corresponding to EP 0678757 and FR 2 718 852
(12) R. Pannetier, Vade-Mecum du Technicien Nucléaire, Seconde èdition, Ed. S. C. F. du Bastet, volume III, 1982.
(13) A. S. Pradhan, R. C. Bhatt, Nuclear Instruments and Methods, vol. 166, 1979, pp. 497–501.
(14) B. Burghardt, E. Piesch, H. G. Rober, S. Ugi, Modern photon energy compensation filters for solid state dosemeters, Kerntechnik, vol. 55, n°6, 1990, pp. 362–367
(15) P. H. Burgess, U.S. Pat. No. 4,876,454. See also U.S. Pat. No. 5,059,801
(16) R. Craig Yoder, R. M. Creaney, U.S. Pat. No. 6,127,685
(17) S. McKeever, M. S. Akselrod, B. G. Markey, U.S. Pat. No. 5,962,857
(18) M. S. Akselrod, V. S. Kortov, E. A. Gorelovza, Rad. Prot. Dos., vol. 47, n°1/4, 1993, pp. 159–164
(19) B. G. Markey, L. E. Colyott, S. W. S. McKeever, Rad. Measurements, vol. 24, n°4, 1995, pp. 457–463
(20) S. W. S. McKeever, M. S. Akselrod, B. G. Markety, Rad. Prot. Dos., Vol. 65, n°1/4, 1996, pp. 267–272

What is claimed is:

1. Radiation sensor for dosimetry, comprising:
at least one element made out of a radiation detection material, wherein this element has first and second extremities and an axis which passes through these first and second extremities, and the material is configured to emit a luminescence radiation and is transparent to this luminescence radiation; and first and second radiation filter screens, wherein the first screen is placed opposite the first extremity of the element and is configured to filter the radiation that reaches the element along a direction close to the axis of the element, the second screen is thicker than the first screen, and this second screen is placed at the periphery of the element and is configured to filter the radiation that reaches the element along a direction close to a direction that is perpendicular to the axis of the element, wherein this sensor is configured to be optically coupled to a flexible light guide configured to collect and convey the luminescence radiation.

2. Sensor according to claim 1, in which the material has an effective atomic number close to 10.

3. Sensor according to claim 1, in which the axis of the element is an axis of symmetry of revolution for this element.

4. Sensor according to claim 1, in which the element is surrounded by a layer for reflecting the luminescence radiation.

5. Sensor according to cliam 1, in which the element has an elongated shape along the element axis and is a cylinder of revolution about this axis and the sensor further comprises a luminescence radiation reflector, wherein the first screen is placed between this reflector and the first extremity of the element, the second extremity of the element configured to be optically coupled to the light guide, the second screen extending along a length of the element from the second extremity of this element, this length depending on the geometry of the element.

6. Sensor according to claim 1, in which the radiation detection material is chosen among the group comprising phosphate type radiophotoluminescent glasses, photo-chromic type luminescent glasses, crystalline radiation detection materials, alumina in the a phase, scintillating crystals and crystals configured to emit an optically stimulated luminescence.

7. Radiation sensor for dosimetry, comprising:
at least one element made out of a radiation detection material, wherein this element has first and second extremities and an axis which passes through these first and second extremities, and the material is configured to emit a luminescence radiation and is transparent to this luminescence radiation; and first and second radiation filter screens, wherein the first screen is placed opposite the first extremity of the element and is configured to filter the radiation that reaches the element along a direction close to the axis of the element, the second screen is thicker than the first screen, and this second screen is placed at the periphery of the element and is configured to filter the radiation that reaches the element along a direction close to a direction that is perpendicular to the axis of the element, wherein this sensor is configured to be optically coupled to a flexible light guide configured to collect and convey the luminescence radiation, the material is configured to emit said luminescence radiation when the material is optically stimulated, the sensor is thus an optically stimulated luminescence radiation sensor, and the light guide is configured to convey a radiation for optically stimulating the element and for illuminating this element with the optically stimulating radiation.

8. Sensor according to claim 7, in which the material has an effective atomic number close to 10.

9. Sensor according to claim 7, in which the axis of the element is an axis of symmetry of revolution for this element.

10. Sensor according to claim 7, in which the element is surrounded by a layer for reflecting the luminescence radiation.

11. Sensor according to claim 7, in which the element has an elongated shape along the element axis and is a cylinder of revolution about this axis and the sensor further comprises a luminescence radiation reflector, wherein the first screen is placed between this reflector and the first extremity of the element, the second extremity of the element configured to be optically coupled to the light guide, the second screen extending along a length of the element from the second extremity of this element, this length depending on the geometry of the element.

12. Sensor according to claim 7, in which the radiation detection material is chosen among the group comprising phosphate type radiophotoluminescent glasses, photo-chromic type luminescent glasses, crystalline radiation detection materials, alumina in the αphase, scintillating crystals and crystals configured to emit an optically stimulated luminescence.

13. Radiation sensor for dosimetry, comprising:
at least one element made out of a radiation detection material, wherein this element has first and second extremities and an axis which passes through these first and second extremities, and the material is configured to emit a luminescence radiation and is transparent to this luminescence radiation;
first and second radiation filter screens, wherein the first screen is placed opposite the first extremity of the element and is configured to filter the radiation that reaches the element along a direction close to the axis of the element, the second screen is thicker than the first screen, and this second screen is placed at the periphery of the element and is configured to filter the radiation that reaches the element along a direction close to a direction that is perpendicular to the axis of the element, and the sensor is configured to be optically coupled to a flexible light guide configured to collect and convey the luminescence radiation; and
a body comprising a cavity in which the at least one element is located and whose wall is configured to reflect the luminescence radiation, as well as a part comprising a boring whose axis is the axis of the at least one element and whose wall is configured to reflect the luminescence radiation, this part being configured to collect this radiation and to convey the radiation to the entry of the flexible light guide, under an angle that is compatible with the numerical aperture of this flexible light guide, when this guide is coupled to the sensor.

14. Sensor according to claim 13, in which the boring has a conical shape.

15. Sensor according to cliam 13, further comprising a focalisation lens between the at least one element and the boring in the part.

16. Radiation sensor for dosimetry, comprising:
at least one element made out of a radiation detection material, wherein this element has first and second extremities and an axis which passes through these first and second extremities, and the material is configured to emit a luminescence radiation and is transparent to this luminescence radiation;
first and second radiation filter screens, wherein the first screen is placed opposite the first extremity of the element and is configured to filter the radiation that reaches the element along a direction close to the axis of the element, the second screen is thicker than the first screen, and this second screen is placed at the periphery of the element and is configured to filter the radiation that reaches the element along a direction close to a direction that is perpendicular to the axis of the element, and the sensor is configured to be optically coupled to a flexible light guide configured to collect and convey the luminescence radiation; and
a laser configured to emit a radiation for stimulating the element made out of radiation detection material and means for detecting the luminescence radiation emitted by this element.

17. Device according to claim 16, further comprising:
a first photo-detector, reflector configured to allow less than 10% of the radiation emitted by the laser to pass towards this first photo-detector and configured to reflect more than 90% of this radiation towards the flexible light guide and a second photo-detector configured to detect the luminescence radiation emitted by the element and conveyed by the flexible light guide, wherein the ratio of signals provided by the first and second photo-detectors allows the variations in the stimulation radiation effectively transmitted to the element to be measured each time this element is interrogated.

* * * * *